United States Patent [19]

Sashiki et al.

[11] Patent Number: 4,537,229
[45] Date of Patent: Aug. 27, 1985

[54] AUTOMATIC WEIGHING APPARATUS AND METHOD

[75] Inventors: Takashi Sashiki, Nagaokakyo; Keiko Sakaeda, Kyoto, both of Japan

[73] Assignee: Kabushiki Kaisha Ishida Koki Seisakusho, Kyoto, Japan

[21] Appl. No.: 532,519

[22] Filed: Sep. 15, 1983

[30] Foreign Application Priority Data

Sep. 16, 1982 [JP] Japan ................. 57-161995
Sep. 16, 1982 [JP] Japan ................. 57-161996

[51] Int. Cl.³ .................... G01G 19/04; B65B 1/32
[52] U.S. Cl. .......................... 141/83; 177/1; 177/25; 141/12; 141/1; 141/81; 222/495
[58] Field of Search ............ 141/12, 71, 81, 83, 141/98, 392, 251, 252, 258, 260; 100/223, 50, 221, 45; 222/309, 370, 491–495, 216–217, 221, 335; 177/25, 60, 1, 64, 50

[56] References Cited

U.S. PATENT DOCUMENTS

| 1,345,865 | 7/1920 | Little ............ 222/370 X |
| 2,199,065 | 4/1940 | Bell ............ 222/370 |
| 3,371,689 | 3/1968 | Carruthers ............ 141/81 |
| 3,802,335 | 4/1974 | Longo ............ 100/50 X |
| 4,123,970 | 11/1978 | Quante ............ 100/45 |
| 4,202,262 | 5/1980 | Claos et al. ............ 100/50 X |
| 4,344,492 | 8/1982 | Hirano ............ 177/25 |
| 4,385,671 | 5/1983 | Hirano ............ 177/25 |

FOREIGN PATENT DOCUMENTS 1303147 7/1962 France ................. 222/370

Primary Examiner—Stephen Marcus
Assistant Examiner—Ernest G. Cusick
Attorney, Agent, or Firm—Staas & Halsey

[57] ABSTRACT

An apparatus for automatically weighing out articles of a type having an apparent specific gravity which is not constant includes means for weighing out the articles into a batch having a target weight, means for filling a constant volume with the weighed out batch of articles, a pressure sensor for sensing pressure that develops when the articles have been introduced into the constant volume, and means responsive to the pressure sensed by the pressure sensor for automatically adjusting the target weight value within preset allowable limits so that the weighed out batch of articles will have a fixed volume. The weighed out batch of articles introduced by the filling means are shaped into the fixed volume. The weight of the batch and the volume thereof within a package are both within preset allowable limits.

9 Claims, 5 Drawing Figures

AUTOMATIC WEIGHING APPARATUS AND METHOD

BACKGROUND OF THE INVENTION

This invention relates to an automatic weighing apparatus and method wherein the weight of a batch of articles and the volume occupied by the articles within a package can be held within preset allowable limits.

Some articles, such as cornflakes and potato chips, experience widely different degrees of swelling because of such processing conditions as applied temperature and material mixture. Such articles therefore differ in shape and size and vary greatly in apparent specific gravity. They also tend to crumble. When weighing out these articles and then packaging them, there are instances where the volume of the packaged product is too large or too small, even though the weight of the articles in the bag or package is equal to a target value or closest to the target value within preset limits. In other words, the change in volume of the packaged articles is in inverse proportion to the change in apparent specific gravity. Since the capacity of a package receiving the articles generally is fixed, too small a product volume in comparison with the package size gives the consumer the impression of a weight shortage. On the other hand, too large a product volume can lead to an improper seal because the package will be too full, and can cause the articles to overflow from the package and impair the packaging process. Accordingly, it is required that volume as well as weight be held within preset allowable limits.

In an effort to satisfy the foregoing requirement, an arrangement has been proposed in which the weighing apparatus is provided with a specific gravity sensor and crusher. The weight of a batch of articles and the volume thereof are held within preset allowable limits by actuating the crusher when a low specific gravity is sensed, and increasing the weighed out value when a high specific gravity is sensed. However, this proposed method damages the articles unnecessarily and destroys their original shape. It also gives rise to extremely small fragments which attach themselves to the weighing hoppers of the weighing apparatus, thereby producing a weighing error. These fragments may also pile up upon a vibratory conveyor, thereby promoting an irregularity in density during the weighing operation. In addition, these fragments and the finely crushed articles produced by the crusher tend to separate from articles which have not been crushed, and one cannot tell when these finer fragments will form a single mass and then be discharged from the apparatus. Accordingly, there is no assurance that raising the weighed out value will necessarily result in a larger volume.

SUMMARY OF THE INVENTION

An object of the present invention is to provide a novel automatic weighing apparatus and method wherein articles to be packaged are prevented from overflowing by arranging it so that the articles do not attain a volume greater than that expected owing to random orientation thereof, and wherein articles can be weighed out to a weight and volume within preset allowable limits.

Another object of the present invention is to provide an automatic weighing apparatus and method wherein articles weighed out to a fixed weight are formed into a fixed volume which is then discharged into a package.

According to the present invention, the foregoing objects are attained by providing an apparatus for automatically weighing out articles of a type having an apparent specific gravity which is not constant. The apparatus operates by weighing out the articles into a batch having a target weight, introducing the batch into a vessel having a fixed volume, sensing the pressure of the articles which have been introduced, and correcting the target weight within preset allowable limits, in accordance with the sensed pressure, in such a manner that the weighed out batch of articles assumes a substantially constant volume.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Reference will now be had to the drawings to describe a preferred embodiment of an automatic weighing apparatus, of combinatorial type, in accordance with the present invention.

Figure 1:
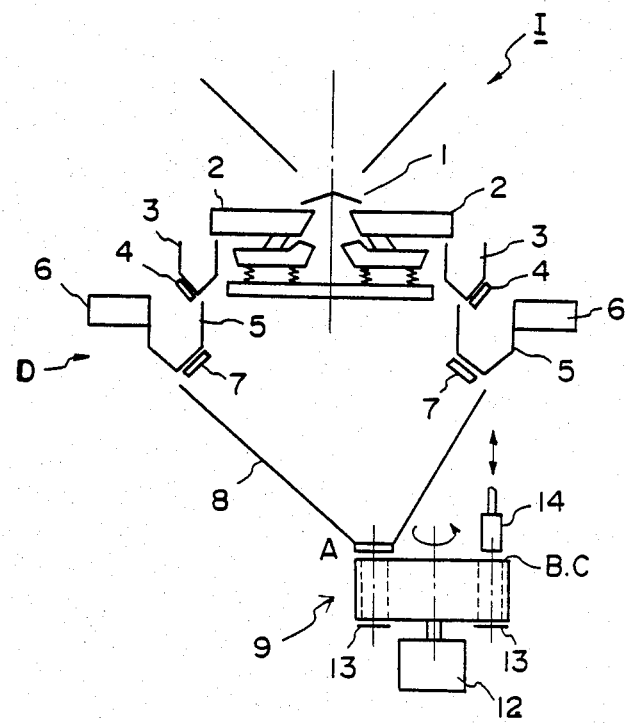
FIG. 1 is a diagrammatic view showing the construction of an automatic weighing apparatus embodying the present invention.

In FIG. 1, which shows the automatic weighing apparatus I in diagrammatic form, numeral 1 denotes a main feeder for supplying a plurality of weighing stations with articles externally introduced to the apparatus. Dispersing feeders 2, receive the articles delivered by the main feeder 1 and disperse them radially outwardly into underlying pool hoppers 3, 3, . . . , where the articles are temporarily retained. Each pool hopper 3 has a pool hopper gate 4 provided at the bottom thereof and adapted to be opened and closed in synchronization with the weighing operation. Weighing hoppers 5, underlying respective ones of the pool hoppers 3, receive the articles discharged from these pool hoppers, and are provided with respective weight sensors 6, for measuring the weight of the articles in each weighing hopper. Provided on the bottom of each weighing hopper 5 is a weighing hopper gate 7 which, by being opened, discharges the articles from the corresponding weighing hopper 5 into a single, common collecting chute 8. The chute 8 collects the articles discharged from the weighing hoppers 5, and delivers them to a fixed volume shaping apparatus 9 at a charge position A. The fixed volume shaping apparatus 9, which has the shape of a cylindrical drum, carries the articles from the charge position A to a shaping position B where the articles are shaped into a batch having a fixed volume, as will be described later, and then discharges the shaped article batch into a packaging machine at a discharge position C.

The automatic weighing apparatus I is composed of n weighing stations, each comprising one of the dispersing feeders 2, pool hoppers 3, pool hopper gates 4, weighing hoppers 5, weight sensors 6, and weighing hopper gates 7, each of these elements therefore being n in number.

The automatic weighing apparatus I operates by combining n weight values ($w_1, w_2, \ldots, w_n$) obtained from the weight sensors 6, and selecting a combination of these weight values that gives a total, combined weight value closest to a predetermined target value. This combination is referred to as the "optimum combination". In the weighing stations having the weight sensors that participate in the selected optimum combination, the weighing hopper gates 7, of the weighing hoppers corresponding to these weight sensors are opened and then, following passage of a set time, closed. The articles thus are discharged from the corresponding weighing hoppers into the collecting chute 8, whence they are introduced into the fixed volume shaping apparatus 9 at the charge position A. The fixed volume shaping apparatus 9, which is rotated in intermittent fashion, i.e., indexed, shapes these articles into a batch of a given volume at the shaping position B and then discharges them into a packaging machine (not shown) at the discharge position C. Following these steps, the weighing hoppers 5 left empty by discharging their articles are supplied with articles afresh. These articles are supplied by the corresponding dispersing feeders 2 through the corresponding pool hoppers 3. This prepares the weighing apparatus for the next weighing cycle.

Figure 2:
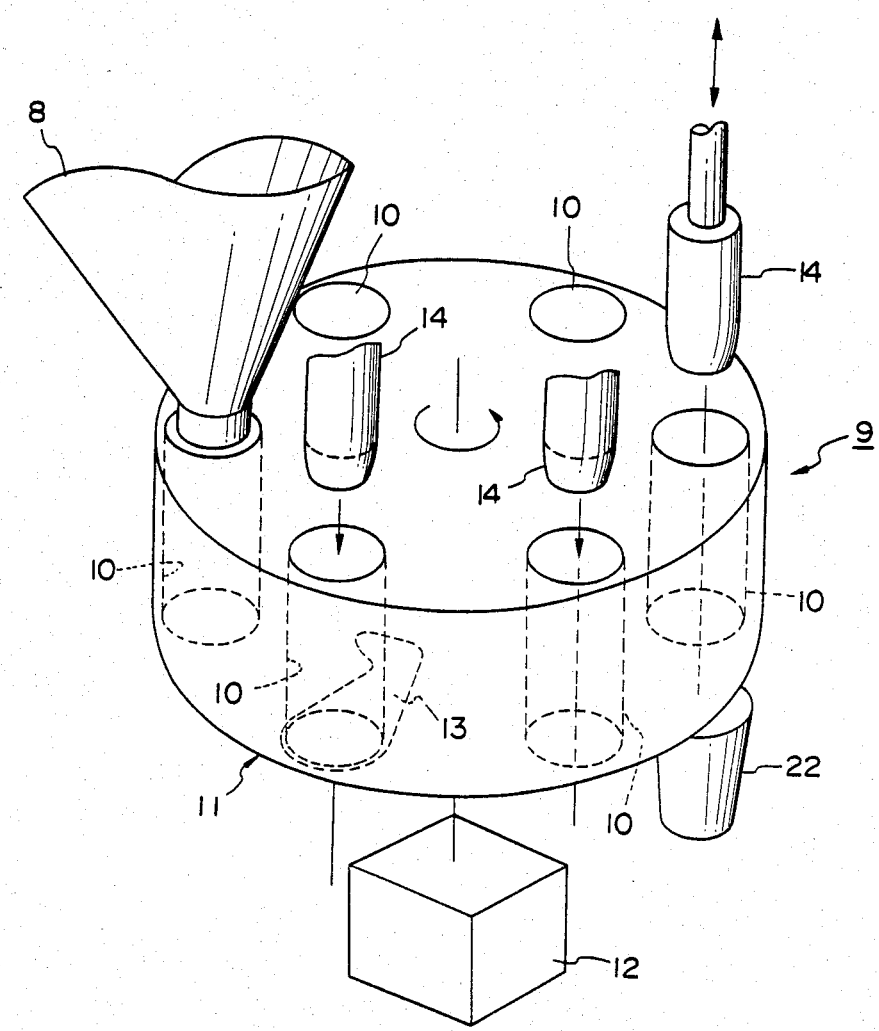
FIG. 2 is a perspective view, seen from above, of fixed volume shaping means employed in the apparatus shown in FIG. 1.
Figure 3:
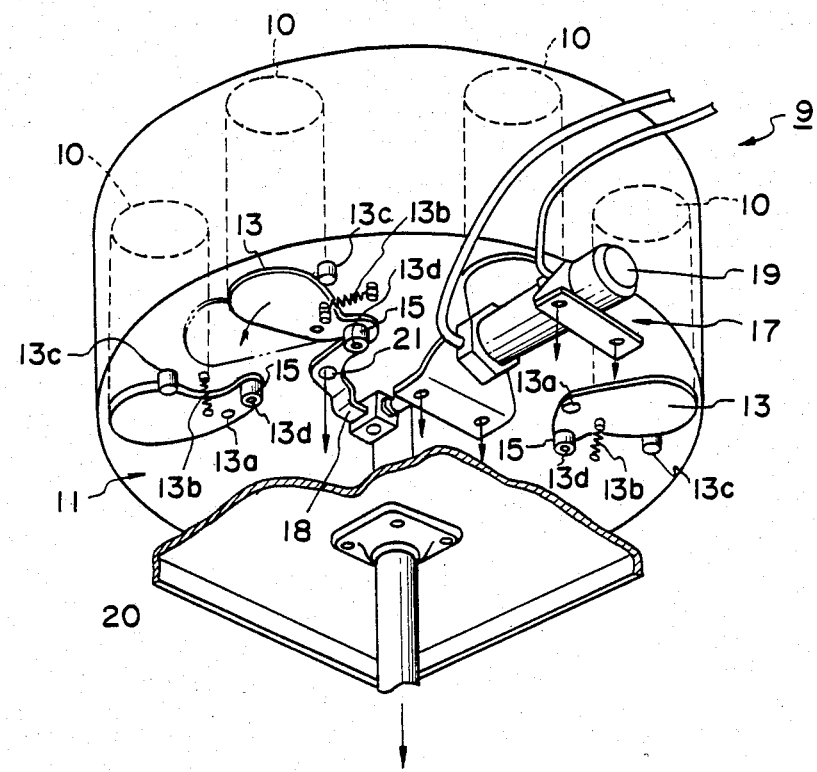
FIG. 3 is a perspective view, seen from below, of the fixed volume shaping means.
Figure 4:
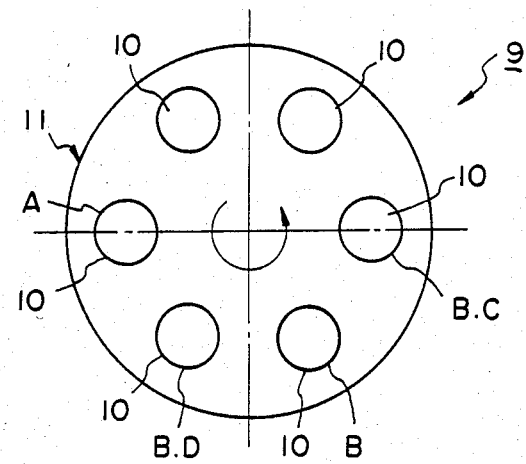
FIG. 4 is a plan view useful in describing the operating positions of the fixed volume shaping means.

The fixed volume shaping apparatus 9 will now be described in conjunction with FIGS. 2, 3 and 4.

The apparatus 9 includes a cylindrical drum 11, and a plurality (six in the illustrated embodiment) of revolving vessels 10 formed as cylindrical bores penetrating through the drum 11 at the circumference thereof. The vessels 10, equidistantly spaced apart along the circumference of the drum 11 as shown in FIG. 4, are open at the top and bottom for receiving and discharging articles, respectively. The drum 11 is adapted to be rotated intermittently through increments of 60° ($=360°/6$) by an intermittent drive unit 12. The drum 11 is provided with a drum gate 13 for each revolving vessel 10. Each drum gate 13 is pivotally attached to the underside of the drum 11 by a pin 13a so as to close off the opening at the lower end of the corresponding vessel 10, and is held in the rest position by a spring 13b and stopper 13c. The arrangement is such that the revolving vessels 10, 10 ... are brought to six stopping positions, decided by the intermittent drive unit 12 which rotates the vessels through increments of 60° before bringing them to a stop. Some of these six positions are suitably assigned as a charge position A, shaping position B, discharge position C and pressure sensing position D, although some positions may serve two purposes. For example, let the position directly below the outlet of the collecting chute 8 be a first position, so that the remaining positions in the direction of rotation (counter-clockwise in FIG. 2) may be referred to as the second, third, fourth, fifth and sixth positions, respectively. In the illustrated embodiment, then, the first position serves as the charge position A, and the second through fourth positions serve as shaping positions B, wherein the second position serves also as the sensing position D, while the fourth position serves also as the discharge position C. It will suffice if there is more than one of the shaping positions B following the discharge position A, with one of the shaping positions doubling as the pressure sensing position D, the last shaping position doubling as the discharge position C. The positions A, B, C and D and are illustrated in FIG. 4. Further, any number of the revolving vessels 10, 10 ... may be provided, as long as the number is greater than two. The vessels may be arrayed in the circular manner illustrated, in the form of an ellipse or in rectangle, or in any other suitable manner. Revolving vessels that are independent of one another may also be used.

A columnar plunger 14 having a somewhat tapered tip is disposed directly above each of the pressure sensing positions B and is moved up and down in synchronization with the rotating cycle of the drum 11 by a reciprocating drive mechanism such as an air cylinder, not shown. More specifically, the plungers 14 are moved downwardly whenever the drum 11 stops, thereby applying pressure to the articles which have been introduced into the revolving vessels 10. The downward stroke of the plungers 14 grows successively larger as the discharge position C is approached, so that the plunger with the greatest stroke is that located at the discharge position. The stroke is set so as to provide a desired volume. It should be noted that the bottom dead center of each plunger 14 is capable of being adjusted to vary the compression volume. Though the means for practicing this are not shown, a suitable arrangement is to vary the stroke of the aforementioned reciprocating driving mechanism, such as the air cylinder. An alternative is to change the connecting link ratio between the plungers 14 and the reciprocating driving mechanism. Further, rather than relying upon the columnar plungers, the articles within the revolving vessels 10 can be subjected to air pressure to shape them into the batch of the desired volume.

A roller 15 is connected to one end of each drum gate 13 by a pin. When a revolving vessel 10 has arrived at the discharge position C, the roller 15 attached to the gate 13 at the bottom of the vessel is pressed by an open/close unit 17. This causes the drum gate 13 to pivot about the pin 13a to open the bottom of the vessel so that the articles may be released into a discharge chute 22. The open/close unit 17 comprises an L-shaped lever 18, and a reciprocating drive mechanism such as an air cylinder 19 having a rod to the end of which the lever 18 is rockably connected by a pin. The tip of the lever 18 is set at a position where it will press against the roller 15 when the drum 11 comes to rest, the mid-portion of the lever 18 being axially supported on a stationary frame 20 by a pin 21. The air cylinder 19 is fixedly secured to the frame 20. In the illustrated embodiment, each roller 15 fits on the pin 13d of the corresponding drum gate 13, as described above. However, use of the rollers 15 is not strictly required. Instead, the end of each plate-like drum gate 13 can be bent to form a projection which is pressed by the tip of the lever 18.

The fixed volume shaping apparatus operates in the following manner. At the end of the first combinatorial computation, weighing hopper gates belonging to the weighing stations in a selected combination are opened, whereby the articles contained in these weighing hoppers are discharged into the collecting chute 8, from which they are introduced into whichever of the revolving vessels 10 of the drum 11 is situated at the charge position A. Further, the plungers 14 are lowered, as air pressure is introduced, into the revolving vessels 10 located at the shaping positions B and, at the same time, the open/close unit 17 is actuated at the discharge position C so that the lever 18 presses against the roller 15 of the drum gate 13 that is situated at the discharge position. This causes the drum gate 13 to pivot and open the bottom of the directly overlying revolving vessel 10. These operations take place even if the vessels 10 are empty. When the plungers 14 returns to their original positions, the intermittent drive unit 12 is actuated to index the drum 11 by one position, during which time a weighing operation is being carried out in parallel fashion. If a combinatorial computation should be completed early, the weighing hopper gates 7 in the combination selected by the computation are not opened until the drum 11 is moved into position and stopped. When the drum 11 has been stopped at the predetermined position and the combinatorial computation is completed, the weighing hopper gates 7 of the selected weighing hoppers are opened to discharge their articles into the chute 8, whence the articles are introduced into revolving vessel 10 newly brought to the charge position A by the drum 11. These operations are repeated in the manner described. At the fourth such operation, when the plungers 14 are lowered and the open/close unit 17 is about to be actuated, the opening operation now takes place only after waiting for the arrival of an external signal from a packaging machine or the like. It is also possible to adopt an arrangement in which this signal is produced up to the fourth time. The reason for the FIG. four is that it takes four times for a vessel 10 to be indexed from the charge position A to the discharge position C. If it were to take six times to index a vessel from the charge position A to the discharge position C, then the signal would appear at the sixth indexing operation.

When the signal indicating that a discharge may take place is produced, the plungers 14 are lowered and the open/close unit 17 is actuated. Since the articles discharged from the chute 8 by the first operation will now be at the discharge position C, the shaped articles are discharged from the vessel at this position to means external to the apparatus. Next, the plungers 14 and the open/close unit 17 are restored and the intermittent drive unit 12 is actuated to index the drum 11 by one position, during which time the weighing apparatus performs a weighing operation. When the drum 11 comes to a stop and the combinatorial computation ends, the weighing hopper gates 7 of the selected weighing hoppers are opened to again introduce articles into the revolving vessel 10, which is located at the charge position A, through the collecting chute 8. Thereafter, the foregoing operations are repeated just as described.

Figure 5:
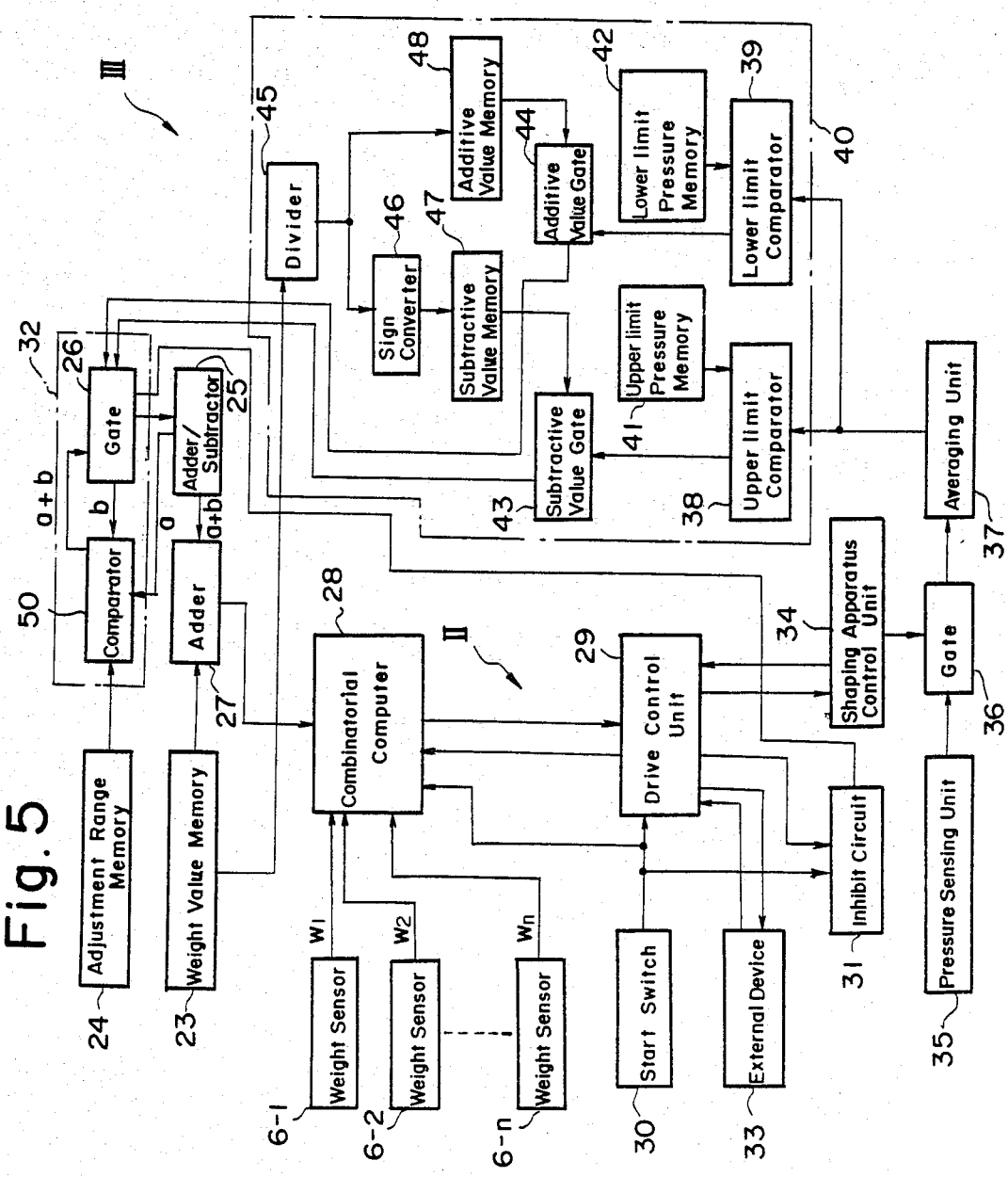
FIG. 5 is a block diagram showing an apparatus for automatically adjusting a target weight according to the present invention.

Reference will now be had to FIG. 5 to describe an apparatus, indicated at III, for adjusting a target weight value in accordance with the present invention.

Numerals 6-1, 6-2, ... 6-n denote weight sensors, which are the same as those shown in FIG. 1, for producing signals indicative of the weight values $w_1, w_2, \ldots w_n$ of the articles contained in the corresponding weighing hoppers, 5, 5 ... 5. Numeral 23 denotes a memory device for setting and storing a target weight value, 24 a memory device for setting and storing an allowable weight value range (upper and lower limit values) decided based upon the weighing method or production schedule, and 25 an adder/subtractor for adding or subtracting input values received from a gate 26, and for storing the result as an adjustment value. More specifically, the adder/subtractor 25, which has an initial value of zero, is adapted to successively add or subtract values that arrive through the gate 26. For example, if the state of the adder/subtractor 25 is "a" and "b" arrives as an input from the gate 26, then these will be added to make the state of the adder/subtractor "a+b". An adder 27 adds the contents of the weight value setting memory 23 and the contents of the adder/subtractor 25, and stores the result, with the output of the adder 27 serving as the target value of a combinatorial computation. Numeral 28 denotes a combination computing unit for performing a combinatorial computation based on the target value obtained from the adder 27. Specifically, the computing unit 28 combines the weight values $w_1, w_2, \ldots w_n$ produced by the respective weight sensors 6-1, 6-2, ... 6-n, selects the optimum combination of weight values that gives a total, combined weight value equal or closest to the value in the adder 27, and provides a drive control unit 29, described later, with a signal designating the weighing stations which participate in the optimum combination, and with a completion signal indicating that a combinatorial computation has ended.

Numeral 30 denotes a start switch for starting a weighing operation. Closing this switch starts the combination computing unit 28, the drive control unit 29, and an inhibit circuit 31. The drive control unit 29 controls such mechanical portions as the weighing hopper gates 7, the dispersing feeders 2, and the fixed volume shaping apparatus 9. The inhibit circuit 31, which includes an internal counter and comparison circuit, not shown, inhibits the operation of a gate circuit 32 for a predetermined number of weighing operations following the start of weighing. The counter is reset by a signal from the start switch 30 and is counted up by a signal produced by the drive control unit 29 for opening the hopper gates 7 (or, if preferred, by a signal from the combination computing unit 28 indicating the completion of a combinatorial computation), and the counter inhibits the opening of the gate 26 until a preset numerical value is attained. Numeral 33 denotes an external device, such as a packaging machine, operatively associated with the automatic weighing apparatus I (FIG. 1) and connected to the drive control unit 29. A fixed volume shaping apparatus control unit 34 controls the up-down operation of the plungers 14, the opening and closing of the drum gates 13, and the operation of the intermittent drive unit 12, all of which constitute the fixed volume shaping apparatus 9. A pressure sensing unit 35 senses pressure when the fixed volume shaping apparatus presses the articles in the vessel 10 at position D. The pressure sensing unit 35 includes, e.g., a pressure sensor (not shown) which is provided on the plunger 14 located at the pressure sensing position D, and which is adapted to produce an electric signal indicative of the sensed pressure. A gate 36 is opened by a timing signal from the fixed volume shaping apparatus control unit 34 to deliver the electric signal generated by the pressure sensor. Numeral 37 denotes an averaging unit for taking the average of the pressure signals produced by the pressure sensing unit 35. The averaging unit 37 includes an internal shift register (not shown) which receives as an input the pressure values delivered successively by the gate 36, computes the average value of a preset number of these pressure values only, and delivers the result to upper and lower limit comparators 38, 39, respectively.

Numeral 40 denotes comparing and computing means for comparing the average value output of the averaging unit 37 with preset upper and lower limit pressure values, and for producing a prescribed subtractive value when the average value is greater than the upper limit pressure value, and a prescribed additive value when the average value is less than the lower limit pressure value. The comparing and computing means 40 includes an upper limit pressure value setting memory 41 in which there is set and stored an upper limit value of pressure that provides a limit value for the purpose of diminishing a weight value, a lower limit pressure value setting memory 42 in which there is set and stored a lower limit value of pressure that provides a limit value for the purpose of raising a weight value, the abovementioned upper limit comparator 38 for comparing the average value obtained from the averaging unit 37 with the upper limit pressure value obtained from the memory 41, and for opening a subtractive value gate 43 when the average value is larger, and the abovementioned lower limit comparator 39 for comparing the average value obtained from the averaging unit 37 with the lower limit pressure value obtained from the memory 42, and for opening an additive value gate 44 when the average value is smaller. The comparing and computing means 40 further comprises a divider 45 for dividing the contents of the weight value setting memory 23 by a preset number. The quotient produced by the divider 45 is applied to a subtractive value memory 47 as a subtractive value upon being provided with a negative sign by a sign converter 46, and is applied directly to an additive value memory 48 as an additive value. In an alternative arrangement, which is not shown, the divider 45 may be deleted and the additive and subtractive values set directly in the additive and subtractive memories 47, 48, respectively.

The gate circuit 32, upon receiving the additive or subtractive value b from the comparing and computing means 40, combines this value with the adjustment value a stored in the adder/subtractor 25. When the result a+b falls within the allowable range set in the adjustment range setting memory 24, the additive or subtractive value b is applied to the adder/subtractor 25.

The gate circuit 32 includes the earlier mentioned gate 26 and a comparator 50. The latter compares the contents of the adjustment range setting memory 24 with the value a+b, which is obtained by adding the adjustment value a, stored previously in the adder/subtractor, and the value b delivered through the gate 26. When a+b fall within the allowable range, the comparator 50 delivers a signal that opens the gate 26.

The target value adjusting apparatus III operates in the following manner.

Prior to the start of operation, each of the dispersing feeders 2, is filled with a suitable amount of the articles to be weighed, and each of the pool hoppers 3, and weighing hoppers 5, is supplied with a suitable amount of the articles. The desired weight value, namely a target value x, is stored in the weight value setting memory 23, and upper and lower limit values $x_1$, $x_2$ are stored as the allowable range in the adjustment range setting memory 24. Under these conditions, the weight sensors 6-1, 6-2, ... 6-n measure the weights $w_1$, $w_2$, ... $w_n$ of the articles in the corresponding weighing hoppers, and deliver the signals indicative of these weight values to the combination computing unit 28. The divider 45 divides the target weight x by a prescribed value to produce a quotient of $\Delta x$ grams. The quotient $\Delta x$ is applied to the additive value memory 48, and $-\Delta x$ is applied to the subtractive value memory 47 owing to the sign conversion effected by the sign converter 46. The initial value of the adder/subtractor 25 is zero, p is the value preset for the inhibit circuit 31, and q is preset in the averaging unit 37 as the number of samplings taken for computing an average (p>q).

When the start switch 30 is closed, the counter within the inhibit circuit 31 is reset, the combination computing unit 28 starts computing combinations of the weight values $w_1$, $w_2$, ... $w_n$, selects an optimum combination of these weight values on the basis of the target value obtained from the adder 27, and provides the drive control unit 29 with a signal indicative of the optimum combination, and with a signal indicating completion of the combinatorial computation. The drive control unit 29 opens the weighing hopper gates 7 belonging to the weighing stations selected by the optimum combination, and sends a signal indicating that the hopper gates have been opened to the fixed volume shaping apparatus control unit 34 and inhibit circuit 31. The drive control unit 29 then drives the dispersing feeders 2 belonging to the selected weighing stations so that articles are supplied from the corresponding pool hoppers 3 to the corresponding weighing hoppers 5, these having been emptied by discharging their articles through the opened weighing hopper gates 7. The drive control unit 29 receives a signal from the external device 33, such as a packaging machine, confirming that the device is ready to receive the discharged articles, and produces a timing signal upon passage of a preset time period which starts being measured by a timer from the instant the weighing hopper gates 7 are opened. The timing signal is applied to the fixed volume shaping apparatus control unit 34 to initiate the downward motion of the plungers 14 and the opening of the drum gate 13 of whichever revolving vessel 10 is located at the discharge position C. In the illustrated embodiment, we will assume that the signal from the external device 33 is present from the first through third arrivals of the aforementioned timing signal. (The figure of three is decided by the number of positions from the charge position A to the discharge position C of the shaping apparatus, as mentioned earlier.)

As the plunger 14 descends, a signal from a microswitch or photoelectric tube attached thereto opens the gate 36, allowing the signal from the pressure sensing unit 35 to enter the shift register within the averaging unit 37. The latter takes the average of values stored in q memories internally of the shift register and delivers the average value to the upper and lower limit comparators 38, 39, respectively. If the average value is smaller than the value in the lower limit pressure value setting memory 42, then the lower limit comparator 39 opens the additive value gate 44 to provide the gate 26 with the contents (additive value) stored in the addition value memory 48. It should be noted that the gate 26 cannot be opened, owing to the action of the inhibit circuit 31, unless the number of weighing operations performed so far is p or more. In the event that the average value is greater than the value in the upper limit pressure value setting memory 42, the upper limit comparator 38 opens the subtractive value gate 43 to provide the gate 26 with the contents (subtractive value) stored in the subtractive value memory 48. When the fixed volume shaping apparatus control unit 34 raises the plungers 14 and actuates the open/close unit 17, it then proceeds to actuate the intermittent drive unit 12 to index the drum 11 by one position, after which the control unit sends a signal indicative of the fact to the drive control unit 29. The latter responds by opening the pool hopper gates 4 in the weighing stations selected by the preceding weighing operation, and then, upon passage of a predetermined length of time (i.e., the time needed for the weight sensor outputs to stabilize), by sending a combinatorial computation start command to the combination computing unit 28. This is followed by closing the pool hopper gates 4 and driving the corresponding dispersing feeders 2. When the drive control unit 29 receives a signal indicating that the drum 11 has been indexed by one position and, moreover, when the combinatorial computation has ended, the control unit 29 opens the weighing hopper gates 7 of the selected weighing sections. This causes the articles from the corresponding weighing hoppers 5 to be discharged into the collecting chute 3, whence the articles are introduced into whichever of the revolving vessels 10 has been newly indexed to the charge position A by the drum 11.

As the foregoing operations are repeated, the revolving vessel containing the articles discharged by the first weighing operation is eventually indexed to the discharge position C, at which position the articles are released from the vessel when the open/close unit 17 is actuated.

In repeating the above-described steps, p combinatorial computations will eventually be performed. At such time, the inhibit circuit 31 releases the gate 26 from the inhibited state, thereby establishing an operating mode wherein the weight value can be controlled. Specifically, the averaging unit 37 computes the average of the most recent q pressure values and delivers the average value to the upper and lower limit comparators 38, 39, respectively. If the average pressure is greater than the value stored in the upper limit pressure memory 41, then the subtractive value gate 43 is opened to deliver the subtractive value from the subtractive value memory 47. Conversely, if the average pressure is smaller than the value stored in the lower limit pressure memory 42, then the additive value gate 44 is opened to deliver the additive value from the additive value memory 48. In order to determine whether the value obtained by adding the value from the gate 26 to the value a in the adder/subtractor 25, namely the amount of change in the original referential weight value, is within the allowable limits, said value is compared with the contents of the adjustment setting memory 24. If the comparator 50 finds that this value falls within the allowable limits, then the comparator opens the gate 26. By way of example, assume that a is the value in the adder/subtractor 25, and that b is the value that arrives via the gate 26. The gate 26 will be opened when the following relation holds: $x_2 < a+b < x_1$, where $x_1$ and $x_2$ are the upper and lower limit values, respectively. As a result, a+b becomes the value held in the adder/subtractor 25, so that the value held by the adder 27 becomes x+a+b, where x is the original target value. When the allowable range of the adjustment is exceeded, the gate 26 is not opened, a remains the value in the adder/subtractor 25, and x+a remains the value in the adder 27.

Repeating the foregoing operations makes it possible to grasp a change in the average value of the pressure sensed during the shaping of the articles, allowing the target value for the combinatorial computations to be adjusted to an appropriate value.

In the illustrated embodiment, the weighing apparatus is of the combinatorial type. However, the invention may be applied to any weighing apparatus. What is essential is that the articles be weighed out, and introduced into the fixed volume shaping apparatus 9, in accordance with the target value delivered by the adder 27.

In accordance with the present invention as described and illustrated hereinabove, articles are weighed out and then shaped into a given volume before being delivered to a packaging machine or the like. Therefore, when packaging articles such as potato chips and cornflakes that readily experience changes in density owing to their shape and random orientation, it is possible to prevent these articles from assuming a volume greater than that expected, thereby eliminating the risk of overflow. The invention also prevents problems during weighing caused by the adhesion of fragments or particles produced by crushing the articles. The result is improved weighing accuracy. Furthermore, since articles weighed out to a given weight are shaped into a given volume by the pressure application step that follows weighing, unnecessary breakage of the articles can be avoided, so that there is reduced risk of delivering articles of diminished commercial value. In addition, since the weight of the weighed out articles is corrected to give a certain volume of the articles in accordance with the pressure sensed when shaping the articles into a mass having said volume, the volume and weight of the packaged articles will be very close to the appropriate values even if there should be some shortfall in the volume. It should be noted that there is no decline in the processing capability of the weighing apparatus because the weighed out articles are shaped into the fixed volume in synchronization with the weighing operation.

As many apparently widely different embodiments of the present invention can be made without departing from the spirit and scope thereof, it is to be understood that the invention is not limited to the specific embodiments thereof except as defined in the appended claims.

What we claim is:

1. An automatic weighing apparatus comprising;
   weighing means for weighing out articles having variable specific gravity, to obtain a batch thereof having a weight corresponding to a target weight value and which is within preset allowable limits of the target weight value;
   shaping means for shaping said batch of articles into a fixed volume;
   pressure sensing means for sensing the pressure which develops when the weighed out articles are shaped into the fixed-volume batch, and for providing a corresponding output; and
   target weight value adjusting means responsive to said output from said pressure sensing means for adjusting means for adjusting said target weight value within the preset allowable limits, for subsequent operation of said weighing means, so as to render the volume of batches of weighed out articles substantially constant.

2. The apparatus according to claim 1, wherein said shaping means comprises:
   a plurality of revolving vessels having tops and bottoms, each said vessel being open at the top and bottom thereof and being indexed intermittently into a shaping position in synchronization with said weighing out, wherein each batch of said weighed out articles is introduced into a respective one of said vessels;

an openable and closable hatch provided at the bottom, open end of each said revolving vessel so as to selectively close off said bottom, open end;

a vertically movable shaping member provided at said shaping position for said shaping into said fixed volume, the batch of articles introduced into the respective revolving vessel being indexed to said shaping position; and means provided at a discharge position for opening the batch of each said revolving vessel indexed to said discharge position, thereby discharging the respective batch of articles with said fixed volume from each said revolving vessel.

3. The apparatus according to claim 2, wherein said shaping member comprises a plunger insertable a predetermined distance into said revolving vessels.

4. The apparatus to claim 3, comprising a plurality of said shaping positions and a corresponding plurality of said plungers, wherein successive ones of said plungers are insertable to deeper predetermined distances into said revolving vessels, and the last of said plungers determines said fixed volume.

5. The apparatus of claim 1, wherein said target weight value adjusting means includes means for averaging a predetermined number of successive outputs from said pressure sensing means, corresponding to successively weighed out batches of said articles, for the adjusting of said target weight value.

6. The apparatus of claim 1, wherein each said batch with said weight corresponding to said target weight value is selected by said weighing means from a plurality of possible batches to be the batch closest to said target weight and within said preset allowable limits thereof.

7. A method automatically weighing out articles of a type having a variable specific gravity, comprising the steps of:

weighing out the articles to obtain a batch having a weight corresponding to a target weight value and which is within preset allowable limits of said target weight value;

introducing the weighed out batch of articles into a vessel and shaping the batch of articles into a batch having a fixed volume;

sensing the pressure that occurs when the articles are subject to said shaping; and adjusting the target weight value within the preset allowable limits, for subsequent weighing out of batches of said articles, on the basis of the sensed pressure, so as to render the volume of weighed out articles substantially constant.

8. The method of claim 7, wherein said adjusting of said target weight value is on the basis of an average value of the sensed pressure for a repsective plurality of the weighed out batches of articles, so that said target weight value is generally adjusted downward if the average value of the sensed pressure is larger than a first predetermined value, and generally adjusted upward if the average value is smaller than a second predetermined value that is smaller than said first predetermined value, and wherein said adjusting is performed only for adjusted target values within said preset allowable limits.

9. The method of claim 7, wherein each said batch with said weight corresponding to said target weight value is selected by said weighing means from a plurality of possible batches to be the batch closest to said target weight and within said preset allowable limits thereof.

* * * * *

UNITED STATES PATENT AND TRADEMARK OFFICE
CERTIFICATE OF CORRECTION

PATENT NO. : 4,537,229
DATED : Aug. 27, 1985
INVENTOR(S) : Takashi Sashiki et al It is certified that error appears in the above-identified patent and that said Letters Patent is hereby corrected as shown below:

```
Column 4, line 5, after "D," insert --and--;
          line 7, delete "and";
          line 11, delete "in" (first occurrence).

Column 10, line 59, delete "means for adjusting".

Column 12, line 3, after "method" insert --of--.
```

Signed and Sealed this

Twenty-fourth Day of December 1985

[SEAL]

Attest:

DONALD J. QUIGG

Attesting Officer

Commissioner of Patents and Trademarks